United States Patent
Numakami

(10) Patent No.: US 10,575,344 B2
(45) Date of Patent: Feb. 25, 2020

(54) COMMUNICATION APPARATUS, COMMUNICATION CONTROL METHOD, AND STORAGE MEDIUM

(71) Applicant: CANON KABUSHIKI KAISHA, Tokyo (JP)

(72) Inventor: Yukio Numakami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 15/909,878

(22) Filed: Mar. 1, 2018

(65) Prior Publication Data
US 2018/0263069 A1 Sep. 13, 2018

(30) Foreign Application Priority Data
Mar. 7, 2017 (JP) .................. 2017-043336

(51) Int. Cl.
*H04W 76/10* (2018.01)
*H04W 4/80* (2018.01)
*H04W 84/12* (2009.01)
*H04L 29/08* (2006.01)
*H04W 88/08* (2009.01)

(52) U.S. Cl.
CPC ............. *H04W 76/10* (2018.02); *H04W 4/80* (2018.02); *H04L 67/10* (2013.01); *H04W 84/12* (2013.01); *H04W 88/08* (2013.01)

(58) Field of Classification Search
CPC ......... H04W 76/10; H04W 4/50; H04W 4/70; H04W 4/80; H04W 84/12; H04W 88/08; H04L 67/10
See application file for complete search history.

(56) References Cited

U.S. PATENT DOCUMENTS

| 8,683,055 | B2 * | 3/2014 | Suumaki | H04L 61/2007 709/228 |
| 2009/0122787 | A1 * | 5/2009 | Huotari | H04L 63/0853 370/352 |
| 2014/0181916 | A1 * | 6/2014 | Koo | H04W 12/08 726/4 |
| 2014/0317242 | A1 * | 10/2014 | Koo | H04L 67/1097 709/219 |

FOREIGN PATENT DOCUMENTS

| JP | 2015-056778 A | 3/2015 |
| JP | 2016-152430 A | 8/2016 |

* cited by examiner

*Primary Examiner* — Walter J Divito
(74) *Attorney, Agent, or Firm* — Canon U.S.A., Inc. IP Division

(57) ABSTRACT

A communication apparatus includes a setting unit that sets first setting information for connecting to an access point and second setting information for connecting to a server, a first retention unit that retains first state information indicating that the first setting information is in a state of being set, a second retention unit that retains second state information indicating that the second setting information is in a state of being set, and an updating unit that updates, in a case where the communication apparatus connects to the access point, the first state information indicates that the first setting information is in a state of being set, and the second state information indicates that the second setting information is in a state of being set, the first state information to indicate that the second setting information is in a state of being set.

8 Claims, 12 Drawing Sheets

FIG.5A

| PROPERTY (46) | TYPE OF VALUE (51) | ACCESS MODE (52) | SETTING INFORMATION (53) |
|---|---|---|---|
| PROVISIONING STATUS | NUMERICAL VALUE | R | INDICATING PROVISIONING STATUS OF OCF DEVICE<br>0: PROVISIONING UNEXECUTED<br>1: Wi-Fi AP CONNECTION IN PROGRESS<br>2: Wi-Fi AP CONNECTION COMPLETED<br>3: Wi-Fi AP CONNECTION FAILED<br>4: CLOUD SETTING COMPLETED<br>5: CLOUD SETTING FAILED (411) |
| FINAL ERROR CODE | NUMERICAL VALUE | R | CAUSES DURING PROVISIONING FAILURE<br>0: NO ERROR<br>1: SPECIFIED SSID NOT FOUND<br>2: Wi-Fi PASSWORD BEING INCORRECT<br>3: NO IP ADDRESS ASSIGNED<br>4: INTERNET CONNECTION FAILED<br>5: TIME-OUT<br>6: UNKNOWN ERROR (412) |

FIG.5B

| PROPERTY (46) | TYPE OF VALUE (51) | ACCESS MODE (52) | SETTING INFORMATION (53) |
|---|---|---|---|
| CLOUD SETTING STATUS | NUMERICAL VALUE | R | INDICATING CLOUD SETTING STATUS OF OCF DEVICE<br>0: CLOUD SETTING UNEXECUTED<br>1: CLOUD SETTING COMPLETED<br>2: CLOUD SETTING FAILED (50) |

COMMUNICATION APPARATUS, COMMUNICATION CONTROL METHOD, AND STORAGE MEDIUM

BACKGROUND

Field

Aspects of the present disclosure generally relate to a communication apparatus, a communication control method, and a storage medium.

Description of the Related Art

Due to the recent spread of wireless communications such as a wireless local area network (LAN) and Bluetooth®, in various locations, communication apparatuses use such communication functions to construct and operate wireless networks for exchanging information.

These communication apparatuses are required to previously set wireless network information, which is parameters used to perform wireless communication, at the time of, for example, the initial installation thereof. The wireless network information being set enables communication apparatuses to be interconnected in a concentrated manner via an intended access point (hereinafter referred to as an "AP") so as to enjoy various Internet services.

Usually, initial setting work for wireless network information (for example, service set identifiers (SSIDs), passwords, and encryption modes) arising when a plurality of such communication apparatuses is installed is complex and time-consuming. To facilitate such initial set work for wireless network information, as discussed in Japanese Patent Application Laid-Open No. 2015-056778 and Japanese Patent Application Laid-Open No. 2016-152430, heretofore, various improved techniques have been proposed.

Japanese Patent Application Laid-Open No. 2015-056778 discusses a communication setting apparatus that stores operation setting information and initial setting information about each of a plurality of communication apparatuses and is configured to be connected to each communication apparatus by wireless communication via an AP. This communication setting apparatus sequentially sets read-in initial setting information to the AP, and accesses each electronic device by wireless communication via the AP and sets operation setting information about each communication apparatus thereto. Japanese Patent Application Laid-Open No. 2016-152430 discusses a point of sale (POS) terminal apparatus that stores an SSID default value and is configured to be connected to a plurality of mobile printers by wireless communication via a representative AP. This POS terminal apparatus searches for a mobile printer available for communication by wireless communication, and acquires an SSID thereof. If a plurality of SSIDs coincident with the SSID default value is acquired, the POS terminal apparatus successively performs initial setting with respect to a plurality of mobile printers with the SSID coincident with the SSID default value.

Recently, the above-described communication apparatuses have also been in widespread use in the field of the Internet of Things (IoT). To use this IoT service, it is necessary to set not only wireless network information for performing wireless communication, but also device-specific setting information required for the IoT service to each communication apparatus prior to the start of operation. Additionally, it is also necessary to set setting information required for connection to a cloud service on the Internet configured with one or more servers to each communication apparatus prior to the start of operation.

One of standards organizations for the IoT is the Open Connectivity Foundation® (OCF). The OCF proposes OCF Wi-Fi® Easy Setup as a method for setting wireless network information (Wi-Fi® parameter information) required for connecting an OCF service-compatible device to a home Wi-Fi® AP. Hereinafter, wireless network information is referred to as "Wi-Fi® parameter information", device-specific setting information is referred to as "device setting parameter information", and setting information for cloud service connection on the Internet is referred to as "cloud setting parameter information".

More specifically, in such a setting method, first, a mobile device sets Wi-Fi® parameter information and device setting parameter information for connection to a Wi-Fi® AP to an OCF device that is connected to the mobile device on a one-to-one basis. Setting of these pieces of parameter information is performed with the mobile device and the OCF device interconnected by peer-to-peer (P2P) wireless communication such as Wi-Fi® P2P (Soft AP) connection or Bluetooth® connection.

After the OCF device is connected to the Wi-Fi® AP, subsequently, the mobile device performs processing for setting cloud setting parameter information to the OCF device.

During execution of the above-mentioned setting method, the OCF device is managing a "provisioning status", which is status information indicating the current setting state. The mobile device refers to this provisioning status, thus being able to check to what extent the setting processing for the OCF device has advanced.

If, however, the above-mentioned setting method for the OCF device is repeatedly performed, in some cases, the actual setting state about the cloud setting parameter information and the provisioning status may become unmatched as follows. Its specific example is described below.

First, software enabled access point (Soft AP) connection (Wi-Fi® P2P connection) is performed between the OCF device and the mobile device, and the mobile device sets Wi-Fi® parameter information for a first Wi-Fi® AP with respect to the OCF device. Then, the OCF device is assumed to be connected to the first Wi-Fi® AP. At this time, the provisioning status of the OCF device becomes "Wi-Fi® parameter setting completed". Subsequently, when the OCF device sets cloud setting parameter information with respect to connection to the mobile device, the provisioning status of the OCF device is updated to "cloud setting completed".

Next, Soft AP connection is performed between the OCF device and the mobile device, and the mobile device sets Wi-Fi® parameter information for a second Wi-Fi® AP with respect to the OCF device. Then, the OCF device is assumed to be connected to the second Wi-Fi® AP. In this instance, the provisioning status of the OCF device would be overwritten with "Wi-Fi® parameter setting completed" although the cloud setting parameter information has previously been set. In other words, the actual setting state about the cloud setting parameter information and the provisioning status retained by the OCF device may become unmatched.

Originally, since connection of an OCF device to a cloud service is possible via any Wi-Fi® AP as long as the OCF device is able to connect to the Internet, cloud setting parameter information about the OCF device does not depend on Wi-Fi® Aps, but only needs to be set once.

After the OCF device is connected to the second Wi-Fi® AP, when referring to the provisioning status of the OCF device, the mobile device would find "Wi-Fi® parameter setting completed". The mobile device, referring to this can erroneously recognize that cloud setting parameter information is not yet set to the OCF device. Therefore, the mobile device may re-perform, with respect to the OCF device, setting of cloud setting parameter information, which is intrinsically unnecessary.

SUMMARY

Aspects of the present disclosure are generally directed to a communication apparatus and a communication control method each of which performs setting for a device that is configured to connect to a server via an access point.

According to an aspect of the present disclosure, a communication apparatus capable of connecting to a server via an access point includes a first acquisition unit configured to acquire first setting information for connecting to the access point, a second acquisition unit configured to acquire second setting information for connecting to the server, a setting unit configured to set the acquired first setting information and the acquired second setting information to the communication apparatus, a connection unit configured to cause the communication apparatus to connect to the access point using the set first setting information and to cause the communication apparatus to connect to the server using the set second setting information, a first retention unit configured to retain first state information that is state information indicating a state of setting of the first setting information and the second setting information to the communication apparatus and which, in a case where the first setting information has been set after the second setting information is set, indicates that the first setting information is in a state of being set, a second retention unit configured to retain second state information that is state information indicating a state of setting of the second setting information to the communication apparatus and which, even in a case where the first setting information has been set after the second setting information is set, indicates that the second setting information is in a state of being set, and an updating unit configured to update, in a case where the connection unit causes the communication apparatus to connect to the access point, the first state information indicates that the first setting information is in a state of being set, and the second state information indicates that the second setting information is in a state of being set, the first state information to indicate that the second setting information is in a state of being set.

Further features will become apparent from the following description of exemplary embodiments with reference to the attached drawings.

BRIEF DESCRIPTION OF THE DRAWINGS

FIGS. 5A and 5B are diagrams illustrating a setting example of provisioning information and a cloud setting status.

DESCRIPTION OF THE EMBODIMENTS

Various exemplary embodiments, features, and aspects will be described in detail below with reference to the drawings. The following exemplary embodiments to be described are merely examples and can be modified or altered as appropriate depending on configurations of apparatuses and various conditions, and these examples are not seen to be limiting. Not all of combinations of features described in the exemplary embodiments are always essential for solutions provided by the disclosure.

In an exemplary embodiment, a state of setting of cloud setting parameter information to a device, such as an OCF device, is retained, and the state of setting of cloud setting parameter information is determined, so that a provisioning status of the device is updated in such a way as to match an actual cloud setting state. This enables preventing a mobile device from re-performing setting of cloud setting parameter information to an OCF device, thus simplifying processing concerning initial setting to the OCF device.

<System Configuration in Exemplary Embodiment>

Figure 1:
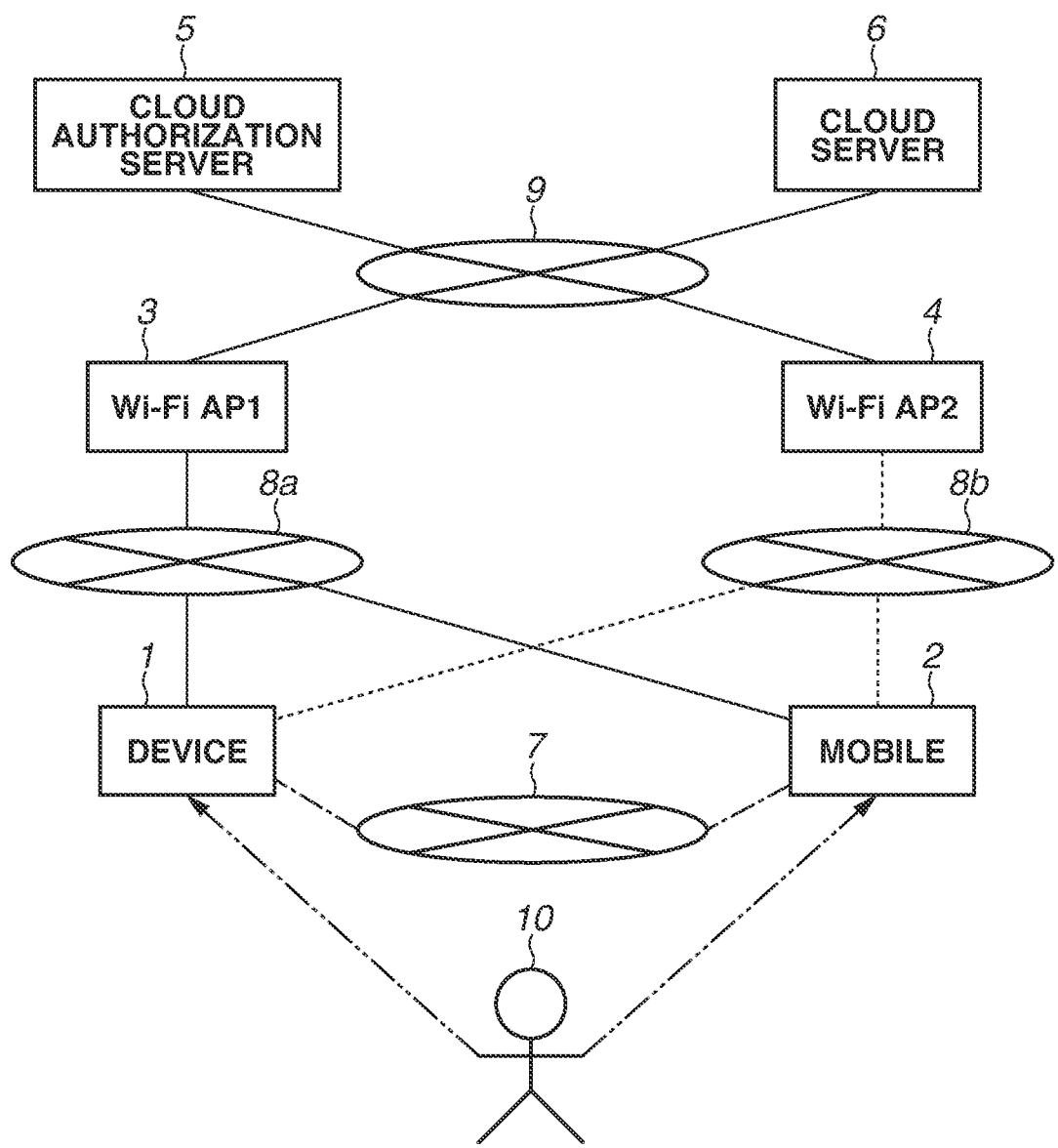
FIG. 1 is a diagram illustrating an example of a network system configuration according to an exemplary embodiment.

FIG. 1 is a diagram illustrating an example of a configuration of a network system (communication system) according to the present exemplary embodiment.

The network system illustrated in FIG. 1 includes a device 1, a mobile 2, a Wi-Fi® AP1 3, a Wi-Fi® AP2 4, a cloud authorization server 5, and a cloud server 6. This network system further includes, as a communication network, a Soft AP communication network 7, a Wi-Fi® AP1 communication network 8a, a Wi-Fi® AP2 communication network 8b, and the Internet 9.

The device 1 is a communication apparatus to which various pieces of setting information for Internet connection via wireless communication are set by the mobile 2, and is, for example, an OCF device compliant with the OCF standard. Specific examples of the device 1 include a digital camera, a digital video camera, a network camera, a printer, a digital multifunction peripheral, a digital television set, a projector, a refrigerator, a washing machine, an illumination lamp, and a door, but are not limited to these and include all of types of IoT devices.

The mobile 2 is a mobile device which sets various pieces of setting information to the device 1, and is, for example, a mobile device compliant with the OCF standard. Specific examples of the mobile 2 include a smartphone, a tablet, a personal computer (PC), and a server, but are not limited to these and include all of types of devices capable of performing peer-to-peer wireless connection (P2P wireless connection) to the device 1.

Each of the Wi-Fi® AP1 3 and the Wi-Fi® AP2 4 is a home Wi-Fi® access point compliant with a wireless LAN standard (for example, the IEEE 802.11 standard series).

The cloud authorization server 5 is an authorization server which performs authentication and authorization required when the device 1 connects to the cloud server 6. In the description of the present exemplary embodiment, the cloud authorization server 5 is assumed to perform authentication and authorization conforming to a standard protocol OAuth 2.0.

The cloud server 6 is configured with one or a plurality of servers, and provides an IoT cloud service which the device 1 uses. In the present exemplary embodiment, an IoT cloud service which the cloud server 6 provides is not specifically limited. Both the device 1 and the mobile 2 are operated by a user 10.

The Soft AP communication network 7 is a wireless LAN network in which the device 1 serves as a Wi-Fi® access point to connect to the mobile 2. Furthermore, while, in the description of the present exemplary embodiment, a wireless LAN is used, the present exemplary embodiment is not limited to this. Instead of a wireless LAN, for example, a communication method capable of performing P2P communication, such as Bluetooth®, Near Field Communication (NFC), or radio-frequency identification (RFID), can be used.

The Wi-Fi® AP1 communication network 8a is a wireless LAN network configured with the Wi-Fi® AP1 3 serving as a home Wi-Fi access point. Similarly, the Wi-Fi® AP2 communication network 8b is a wireless LAN network configured with the Wi-Fi® AP2 4 serving as a home Wi-Fi® access point.

The Internet 9 is a wide area network (WAN) in which the device 1 connects to the cloud via the Wi-Fi® AP1 3 or the Wi-Fi® AP2 4.

In FIG. 1, a dashed-two dotted line connecting between the device 1 and the mobile 2 indicates Soft AP connection. Moreover, a solid line connecting between each of the device 1 and the mobile 2 and the Wi-Fi® AP1 3 indicates Wi-Fi® AP1 connection, and a dashed line connecting between each of the device 1 and the mobile 2 and the Wi-Fi® AP2 4 indicates Wi-Fi® AP2 connection.

Figure 2:
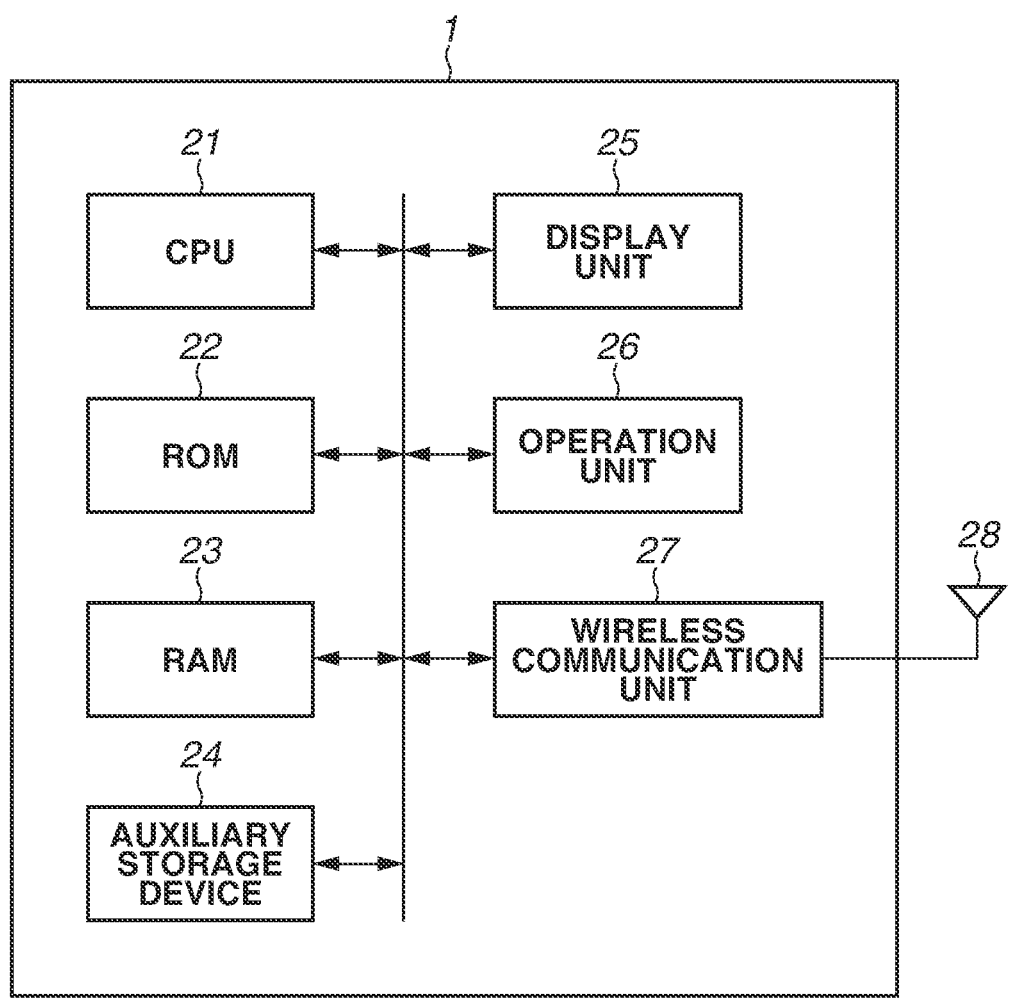
FIG. 2 is a diagram illustrating an example of a hardware configuration of a device according to the exemplary embodiment.

FIG. 2 is a block diagram illustrating an example of a hardware configuration of the device 1 according to the present exemplary embodiment. Referring to FIG. 2, the device 1 includes one or a plurality of central processing units (CPUs) 21, a read-only memory (ROM) 22, a random access memory (RAM) 23, and an auxiliary storage device 24. The device 1 further includes a display unit 25, an operation unit 26, a wireless communication unit 27, and an antenna 28.

The CPU 21 controls the entire device 1. The ROM 22 stores programs and parameters which are not required to be changed. The RAM 23 temporarily stores programs and data which are supplied from, for example, the auxiliary storage device 24. The auxiliary storage device 24 stores various pieces of data, such as content data and setting data, which are used in the present exemplary embodiment.

The display unit 25 provides a graphical user interface (GUI) used for the user 10 to operate the device 1. The operation unit 26 is an input interface used for the user 10 to operate the device 1. The wireless communication unit 27 controls the antenna 28 to perform wireless LAN communication between the device 1 and the mobile 2, the Wi-Fi® AP1 3, or the Wi-Fi® AP2 4.

Furthermore, the hardware configuration of the mobile 2 is similar to that of the device 1, and can be configured to include the units 21 to 28 illustrated in FIG. 2.

<Functional Module Configuration of Present Exemplary Embodiment>

Figure 3:
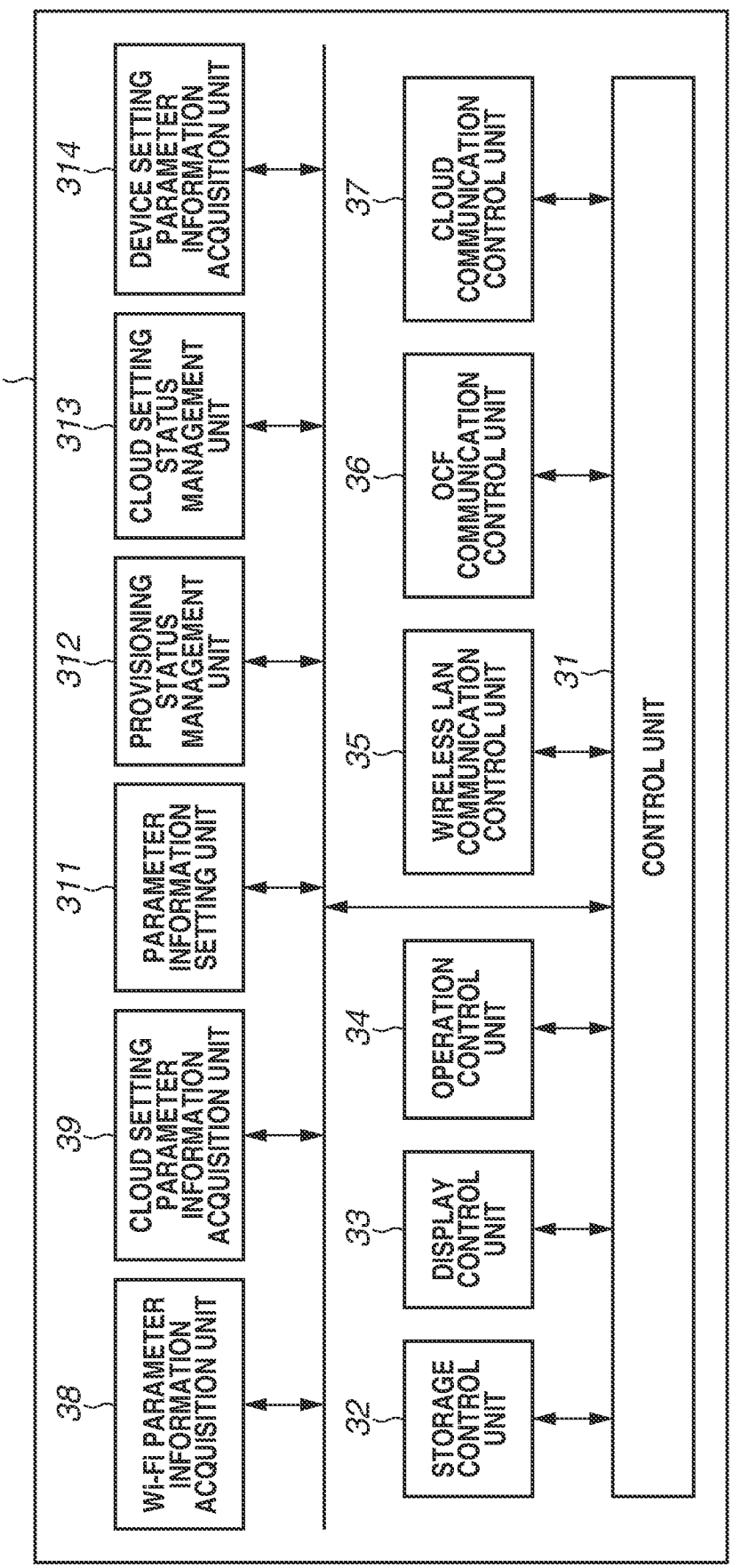
FIG. 3 is a diagram illustrating an example of a functional module configuration of the device according to the exemplary embodiment.

FIG. 3 is a block diagram illustrating an example of a functional module configuration of the device 1 according to the present exemplary embodiment.

Referring to FIG. 3, the device 1 includes a control unit 31, a storage control unit 32, a display control unit 33, an operation control unit 34, a wireless LAN communication control unit 35, an OCF communication control unit 36, and a cloud communication control unit 37. The device 1 further includes a Wi-Fi® parameter information acquisition unit 38, a cloud setting parameter information acquisition unit 39, a parameter information setting unit 311, a provisioning status management unit 312, a cloud setting status management unit 313, and a device setting parameter information acquisition unit 314.

Each functional module illustrated in FIG. 3 can be implemented by software or hardware. If software is used for implementation, a program for providing the function of each functional module to be described below is stored in a memory, such as the ROM 22, and the function of each functional module is implemented by the CPU 21 reading out the program onto the RAM 23 and executing the program. On the other hand, if hardware is used for implementation, for example, a predetermined compiler can be used to automatically generate a dedicated circuit on an FPGA from a program for implementing the function of each functional module. FPGA is an abbreviation for Field Programmable Gate Array. Moreover, a gate array circuit can be formed in the manner similar to that of the FPGA and be implemented as hardware. Additionally, an application specific integrated circuit (ASIC) can be used for implementation. Furthermore, the configuration of the functional block illustrated in FIG. 3 is merely an example, so that a plurality of functional blocks can configure one functional block or any one functional block can be divided into a plurality of blocks which performs respective functions.

The control unit 31 controls processing performed by each individual functional module included in the device 1 and the overall operation performed between these functional modules.

The storage control unit 32 controls the RAM 23 or the auxiliary storage device 24 to store or delete processed data or various pieces of data, such as image content, video content, and sensor data. The display control unit 33 controls the display unit 25 to perform display control of a graphical user interface (GUI) in the device 1. The operation control unit 34 controls the operation unit 26 to perform control of an operation input from the user in the device 1.

The wireless LAN communication control unit 35 controls the wireless communication unit 27 to perform communication control by a wireless LAN communication method between the device 1 and the mobile 2, the Wi-Fi® AP1 3, or the Wi-Fi® AP2 4.

The OCF communication control unit 36 performs communication control that is based on the OCF standard between the device 1 and the mobile 2 via the wireless LAN communication control unit 35. More specifically, the OCF communication control unit 36 performs communication control using the following communication protocol. Examples of the communication protocol include Internet Protocol (IP), User Datagram Protocol (UDP), Constrained Application Protocol (CoAP), and Datagram Transport Layer Security (DTLS).

Moreover, the OCF communication control unit 36 can perform communication control using any of the following other communication protocols. Examples of the other communication protocols include Transmission Control Protocol (TCP), Hypertext Transfer Protocol (HTTP), Transport Layer Security (TLS), and multicast Domain Name System (mDNS).

The cloud communication control unit 37 performs communication control between the device 1 and each of the cloud authorization server 5 and the cloud server 6 via the wireless LAN communication control unit 35 or the OCF communication control unit 36. More specifically, the cloud communication control unit 37 performs communication control using a communication protocol such as IP, TCP, HTTP, TLS, or OAuth 2.0. Moreover, the cloud communication control unit 37 can perform communication control using another communication protocol such as UDP, CoAP, Message Queuing Telemetry Transport (MQTT), DTLS, or OpenID Connect (OIDC).

The above-mentioned communication control units 35, 36, and 37 configure, in conjunction with the wireless communication unit 27, a transmission unit and a reception unit which perform communication between the device 1 and another apparatus.

The Wi-Fi® parameter information acquisition unit 38 controls the OCF communication control unit 36 to acquire Wi-Fi® parameter information used for the device 1 to connect to the Wi-Fi® AP1 3 or the Wi-Fi® AP2 4.

The cloud setting parameter information acquisition unit 39 controls the OCF communication control unit 36 to acquire cloud setting parameter information used to connect to the cloud authorization server 5 and the cloud server 6.

The parameter information setting unit 311 sets the Wi-Fi® parameter information and the cloud setting parameter information acquired by the Wi-Fi® parameter information acquisition unit 38 and the cloud setting parameter information acquisition unit 39 to the device 1.

The provisioning status management unit 312 updates a provisioning status indicating the setting state of the device 1 based on the Wi-Fi® parameter information and the cloud setting parameter information set by the parameter information setting unit 311. More specifically, the provisioning status management unit 312 sets a provisioning status 411 included in provisioning information 41 which is managed by the OCF communication control unit 36 (see FIGS. 4A and 4B). The provisioning status management unit 312 retains the provisioning status in the auxiliary storage device 24 or the RAM 23.

The cloud setting status management unit 313 manages a cloud setting status indicating the setting state at the time of setting of the cloud setting parameter information. In the present exemplary embodiment, the cloud setting status is assumed to include states "cloud setting unexecuted", "cloud setting completed", and "cloud setting failed". Details of the cloud setting status are described below with reference to FIG. 5B. The cloud setting status management unit 313 retains the cloud setting status in the auxiliary storage device 24 or the RAM 23.

The device setting parameter information acquisition unit 314 controls the OCF communication control unit 36 to acquire specific device setting parameter information about the device 1. Furthermore, details of the Wi-Fi® parameter information, cloud setting parameter information, and device setting parameter information are described below with reference to FIG. 4A.

Furthermore, the functional module configuration of the mobile 2 only needs to include the control unit 31, the storage control unit 32, the display control unit 33, the operation control unit 34, the wireless LAN communication control unit 35, and the OCF communication control unit 36 illustrated in FIG. 3, and only needs to allow a parameter setting application for the device 1 to operate.

<Data Configuration in Present Exemplary Embodiment>

Figure 4A:
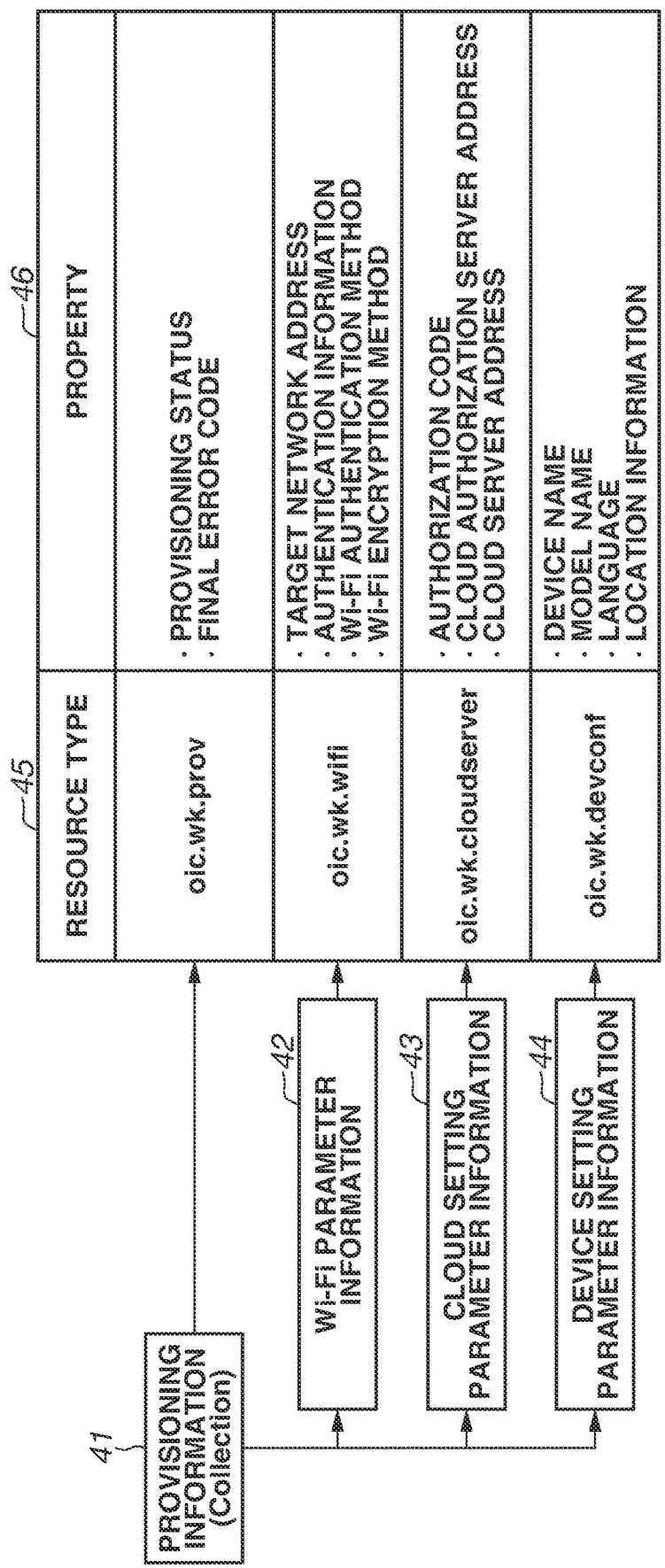
FIGS. 4A and 4B are diagrams illustrating an example of a data configuration of provisioning information which the device retains.

FIG. 4A is a diagram illustrating an example of a data configuration about the provisioning information 41 according to the present exemplary embodiment.

The provisioning information 41 is information about setting of OCF retained by the device 1. Referring to FIG. 4A, the provisioning information 41 is configured to include Wi-Fi® parameter information 42, cloud setting parameter information 43, and device setting parameter information 44. The Wi-Fi® parameter information 42 is parameter information used for the device 1 to connect to the Wi-Fi® AP1 3 or the Wi-Fi® AP2 4. In the present exemplary embodiment, the Wi-Fi® parameter information 42 is described in a property 46 indicated in a column corresponding to a resource type 45 "oic.wk.wifi" illustrated in FIG. 4A. Specifically, the Wi-Fi® parameter information 42 includes attribute information, such as target network address (service set identifier (SSID)), authentication information (password), a Wi-Fi® authentication method, and a Wi-Fi® encryption method.

The cloud setting parameter information 43 is parameter information used to connect to the cloud authorization server 5 and the cloud server 6. In the present exemplary embodiment, the cloud setting parameter information 43 is described in a property 46 indicated in a column corresponding to a resource type 45 "oic.wk.cloudserver" illustrated in FIG. 4A. Specifically, the cloud setting parameter information 43 includes attribute information, such as authorization code, cloud authorization server address (Uniform Resource Locator (URL)), and cloud server address (URL).

The device setting parameter information 44 is device-specific setting information about the device 1. In the present exemplary embodiment, the device setting parameter information 44 is described in a property 46 indicated in a column corresponding to a resource type 45 "oic.wk.devconf" illustrated in FIG. 4A. Specifically, the device setting parameter information 44 includes attribute information, such as device name, model name, language, and location information.

Figure 4B:
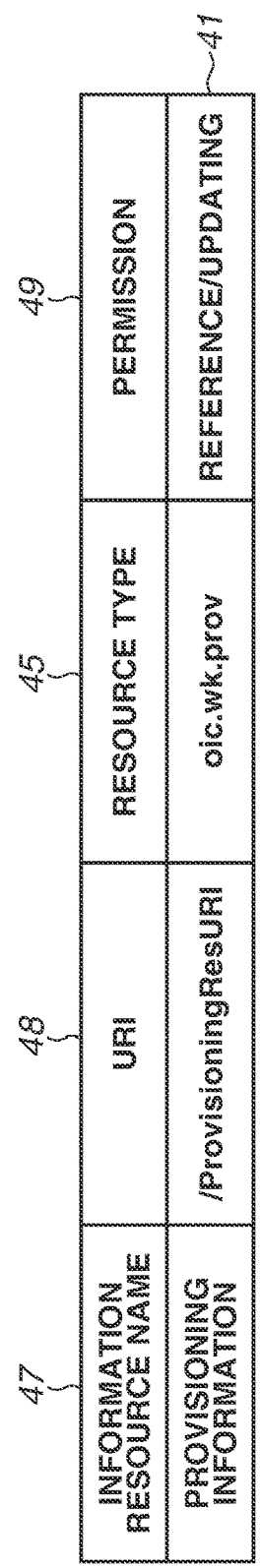

FIG. 4B is a diagram illustrating an example of a resource definition of the provisioning information 41 prescribed by the OCF standard.

In FIG. 4B, information resource name 47 indicates the name of the resource, and, if the resource is the provisioning information 41, it is described as "provisioning information". URI 48 indicates a Uniform Resource Identifier (URI), which is an address used to access the resource. If the resource is the provisioning information 41, it is described as "/ProvisioningResURI". Resource type 45 indicates the data type of the resource, and, if the resource is the provisioning information 41, it is described as "oic.wk.prov". Permission 49 indicates an authority (permission) about access to the resource, and, if the resource is the provisioning information 41, it is described as "reference/updating", in other words, the provisioning information 41 is able to be acquired and updated but unable to be generated and deleted.

FIG. 5A illustrates an example of a data configuration of values of attribute information about the property 46 of the provisioning information 41.

In FIG. 5A, property 46 indicates the name of the attribute information, and type of value 51 indicates the data type of the attribute information. Access mode 52 indicates permission about access to the attribute information. Setting information 53 indicates values to be set in the attribute information.

Provisioning status 411 indicates a state (setting state) indicating to what extent various pieces of setting information included in the provisioning information 41 have been set to the device 1. The type of value is numerical value, and the access mode is R (Read), in which only acquisition is allowed. Moreover, in FIG. 5A, the setting information 53 of the provisioning status 411 has numerical values of 0 to 5 defined therein, which have the following respective meanings. They include "0: provisioning unexecuted", "1: Wi-Fi® AP connection in progress", "2: Wi-Fi® AP connection completed", "3: Wi-Fi® AP connection failed", "4: cloud setting completed", and "5: cloud setting failed".

Final error code 412 indicates error information obtained when various pieces of setting information of the provisioning information 41 have been set to the device 1. The type of value is numerical value, and the access mode is R (Read), in which only acquisition is allowed. Moreover, in FIG. 5A, the setting information of the final error code 412 has numerical values of 0 to 6 defined therein, which have respective meanings indicated in the setting information 53 of the final error code 412 illustrated in FIG. 5A.

FIG. 5B illustrates an example of a data configuration of values of attribute information about a cloud setting status 50 which is managed by the cloud setting status management unit 313 in the present exemplary embodiment.

As with FIG. 5A, in FIG. 5B, property 46 indicates the name of the attribute information, and type of value 51 indicates the data type of the attribute information. Access mode 52 indicates permission about access to the attribute information. Setting information 53 indicates values to be set in the attribute information.

The cloud setting status 50 indicates a setting state obtained at the time of setting of cloud setting parameter information to the device 1. The type of value is numerical value, and the access mode is R (Read), in which only acquisition is allowed. Moreover, in FIG. 5B, the setting information 53 of the cloud setting status 50 has numerical values of 0 to 2 defined therein, which have the following respective meanings. They include "0: cloud setting unexecuted", "1: cloud setting completed", and "2: cloud setting failed". The cloud setting status 50 can include the final error code 412 as with FIG. 5A.

In the present exemplary embodiment, the cloud setting status is assumed to be retained and managed by the device 1 independently with respect to the provisioning status 411 included in the provisioning information 41. However, in terms of implementation, state information (flag) indicating a cloud setting status can be set in the cloud setting parameter information 43 included in the provisioning information 41. Alternatively, a configuration in which a state in which cloud setting has been performed is maintained even after connection to the second Wi-Fi® AP can be employed with use of setting information (status) about cloud setting included in the provisioning status 411.

<Communication Sequence in Present Exemplary Embodiment>

Hereinafter, a communication sequence concerning parameter setting processing performed from the mobile 2 to the device 1 in the present exemplary embodiment is described with reference to FIG. 6 to FIG. 9. In the following description, a communication sequence performed when, after the device 1 sets provisioning information acquired from the mobile 2 to the device 1, the device 1 has switched the connection destination used to connect to the cloud server 6 between the Wi-Fi® AP1 3 and the Wi-Fi® AP2 4 is described as an example.

Figure 6:
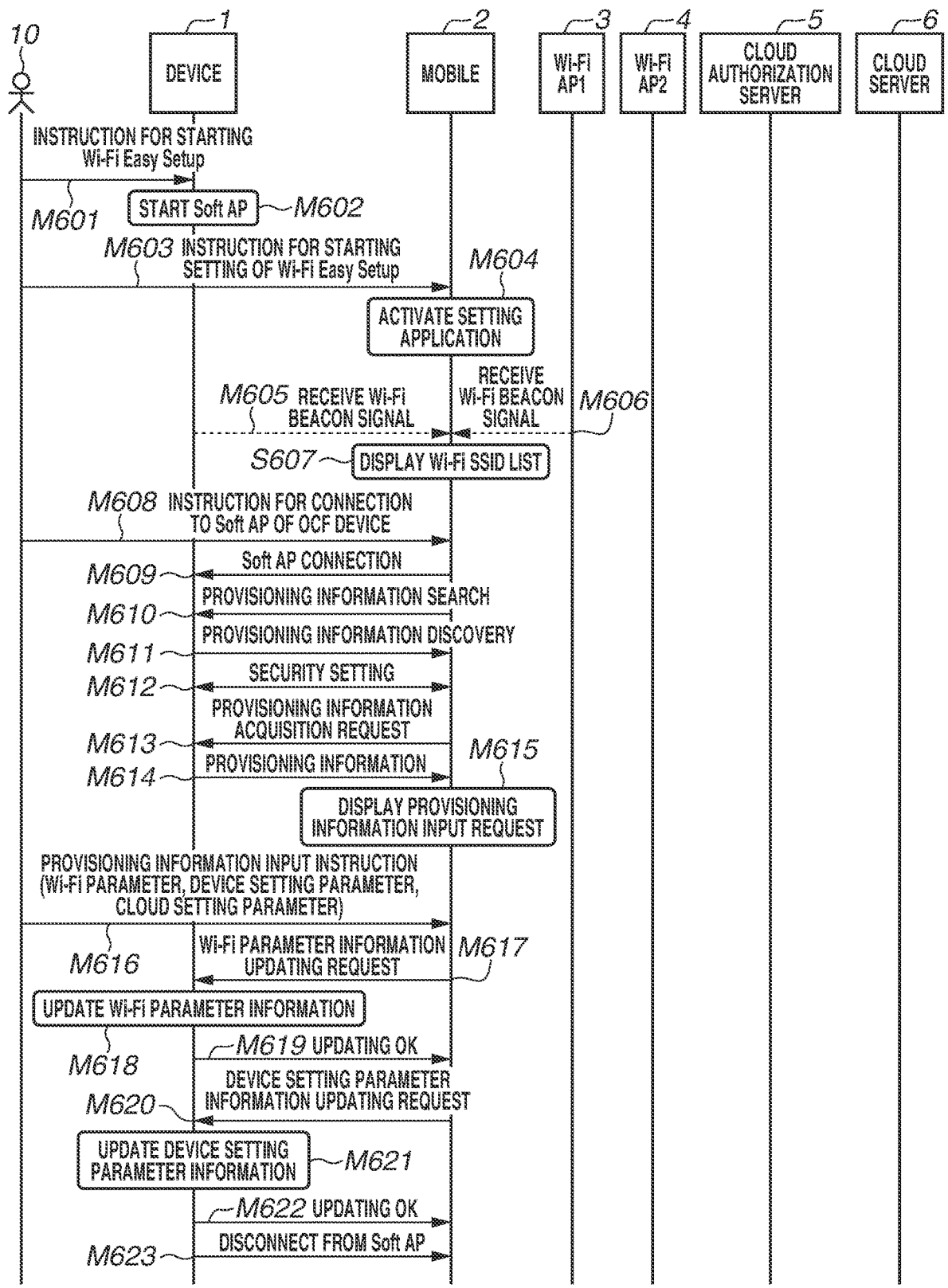
FIG. 6 is a diagram illustrating an example of a processing sequence in which the device connects to a Soft AP and sets Wi-Fi® parameter information in the exemplary embodiment.

FIG. 6 is a sequence diagram illustrating an example of messages sent when, at the time of Soft AP connection of the device 1, the device 1 sets the Wi-Fi® parameter information 42 and the device setting parameter information 44 acquired from the mobile 2 to the device 1. Furthermore, in FIG. 6, during a period from step M609 to step M623, communications between the device 1 and the mobile 2 are performed on the Soft AP communication network 7.

In step M601, the user 10 operates the device 1 to issue an instruction for starting OCF Wi-Fi® Easy Setup. In step M602, in response to the instruction issued by such an operation, the device 1 starts wireless LAN communication in Soft AP mode, i.e., in a mode in which the device 1 itself acts as an access point.

In step M603, the user 10 also operates the mobile 2 to issue an instruction for starting setting of OCF Wi-Fi® Easy Setup. In step M604, in response to the instruction issued by such an operation, the mobile 2 activates a setting application for performing OCF Wi-Fi® Easy Setup.

In step M605, the mobile 2 receives a Wi-Fi® beacon signal concerning Soft AP of the device 1. In step M606, the mobile 2 also receives a Wi-Fi® beacon signal concerning Wi-Fi® AP of the Wi-Fi® AP1 3. Subsequently, in step M607, the mobile 2 displays a Wi-Fi® SSID list on the display unit 25 based on the received Wi-Fi® beacon signal. In step M608, the user 10 operates the mobile 2 to instruct the mobile 2 to connect to Soft AP of the device 1 from the displayed Wi-Fi® SSID list. In step M609, the mobile 2 starts wireless LAN communication connection to Soft AP of the device 1 targeted for connection instruction.

In step M610, the mobile 2 transmits a provisioning information search request using multicast communication on a currently connected network (Soft AP network of the device 1). In step M611, in response, the device 1 transmits, to the mobile 2, a provisioning information discovery response responsive to the provisioning information search request. Furthermore, the provisioning information discovery response is assumed to include a device identifier (ID) able to be used to uniquely identify the device 1. In step M612, the device 1 and the mobile 2 mutually perform security setting so as to perform, for example, encrypted communication or access control.

In step M613, the mobile 2 transmits a provisioning information acquisition request to the device 1. In step M614, in response, the device 1 transmits current provisioning information 41 to the mobile 2. The provisioning information 41 to be transmitted to the mobile 2 includes, besides various pieces of parameter information 42, 43, and 44, the provisioning status 411 and the final error code 412, as illustrated in FIG. 4A.

In step M615, the mobile 2 displays the current provisioning information acquired from the device 1 on the display unit 25 and presents an input request for changing provisioning information to the user 10. In step M616, in response to this input request, the user 10 inputs various pieces of information to be changed with respect to the current provisioning information. Specifically, the input information includes Wi-Fi® parameter information used to connect to the Wi-Fi® AP1 3, cloud setting parameter information used to connect to the cloud authorization server and the cloud server 6, and device setting parameter information which is device-specific setting information about the device 1.

In step M617, the mobile 2 transmits, to the device 1, a Wi-Fi® parameter information updating request based on the Wi-Fi® parameter information input in step M616. In step M618, the device 1 updates the Wi-Fi® parameter information 42 included in the provisioning information 41 based on the Wi-Fi® parameter information received from the mobile 2. In step M619, the device 1 transmits an updating completion response about the Wi-Fi® parameter information 42 to the mobile 2.

In step M620, the mobile 2 transmits, to the device 1, a device setting parameter information updating request based on the device setting parameter information input in step M616. In step M621, the device 1 updates the device setting parameter information 44 included in the provisioning information 41 based on the device setting parameter information received from the mobile 2. In step M622, the device 1 transmits an updating completion response about the device setting parameter information 44 to the mobile 2.

In step M623, the device 1, which has transmitted the updating completion response to the mobile 2, ends Soft AP communication.

Figure 7:
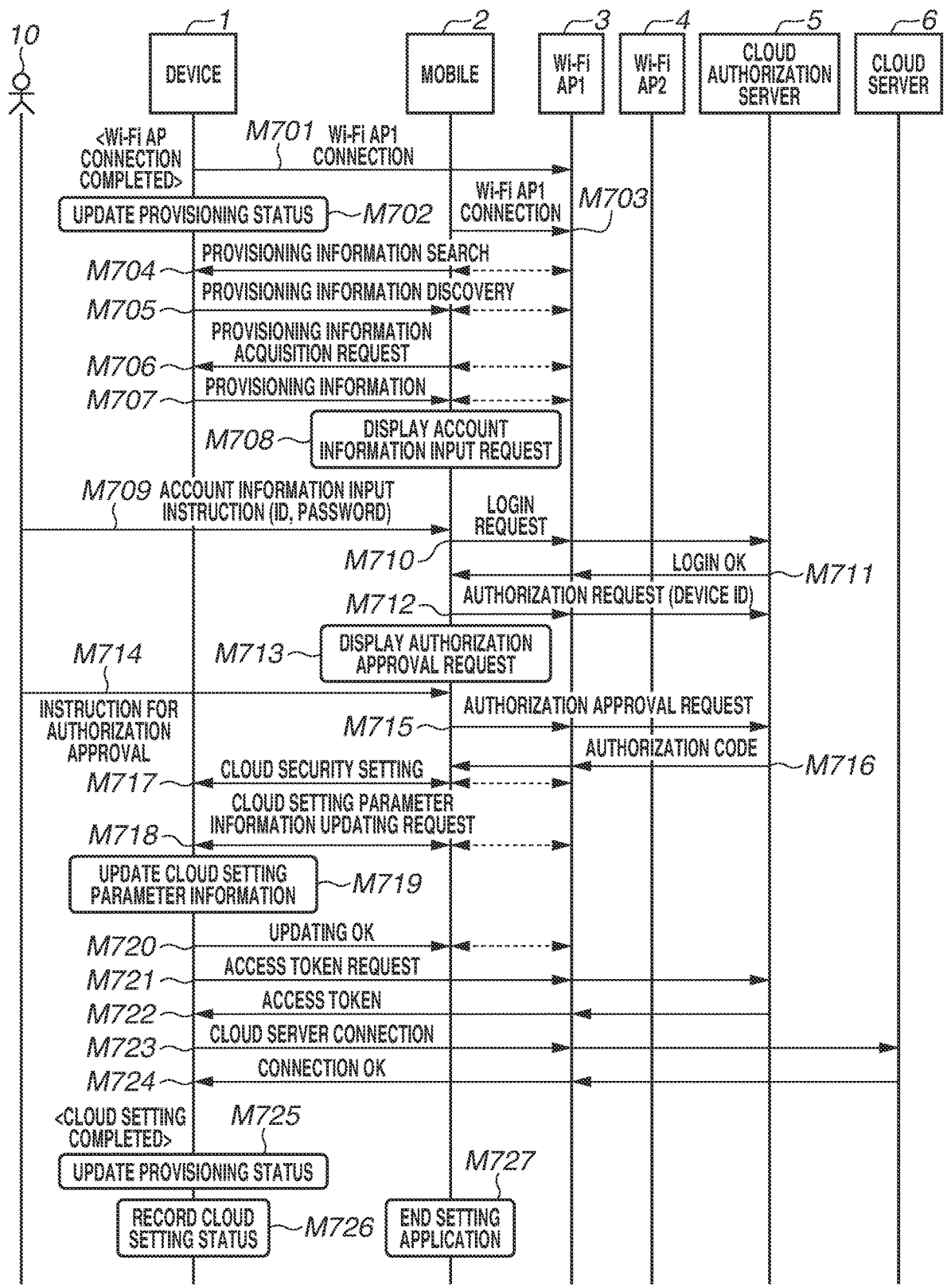
FIG. 7 is a diagram illustrating an example of a processing sequence in which the device connects to a Wi-Fi® AP1 and sets cloud setting parameter information in the exemplary embodiment.

FIG. 7 is a sequence diagram illustrating an example of messages sent when, at the time of Wi-Fi® AP1 connection of the device 1, the device 1 sets the cloud setting parameter information 43 acquired from the mobile 2 to the device 1. Furthermore, in FIG. 7, during a period from step M704 to step M724, communications between the device 1 and the mobile 2 are performed on the Wi-Fi® AP1 communication network 8a.

In step M701, the device 1 connects to the Wi-Fi® AP1 3. Here, connection to the Wi-Fi® AP1 3 is assumed to be successful. In step M702, the device 1 updates the provisioning status 411 included in the retained provisioning information 41 to "Wi-Fi® AP connection completed". In step M703, the mobile 2 connects to the Wi-Fi® AP1 3.

Furthermore, steps M704 to M705, which are similar in processing to steps M610 to M611 illustrated in FIG. 6, and steps M706 to M707, which are similar in processing to steps M613 to M614 illustrated in FIG. 6, are, therefore, omitted from description.

Next, in step M708, the mobile 2 displays, on the display unit 25, an input request for account information used to log in to the cloud authorization server 5. In the present exemplary embodiment, the account information to be input includes an ID and a password. In step M709, the user 10 operates the mobile 2 to input an ID and a password as the account information.

In step M710, the mobile 2 transmits a login request (user authentication request) to the cloud authorization server 5 based on the account information input in step M709. In the present exemplary embodiment, the login request to be transmitted is assumed to be made in an HTTP authentication method. In step M711, the cloud authorization server 5 performs user authentication based on the account information received from the mobile 2, and transmits its authentication result to the mobile 2. Here, login is assumed to be successful.

Next, in step M712, the mobile 2 transmits, to the cloud authorization server 5, an authorization request that is based on the OAuth 2.0 method, which is a common service authorization standard. At this time, the mobile 2 specifies the device ID about the device 1 acquired in step M611 illustrated in FIG. 6 or step M705 illustrated in FIG. 7 as attribute information about the authorization request.

In step M713, the mobile 2 displays, on the display unit 25, an authorization approval request for the device 1 received from the cloud authorization server 5 as a response to the authorization request made in step M712. In step M714, the user 10 operates the mobile 2 to input an instruction for the authorization approval with respect to the device 1. In step M715, the mobile 2 transmits an authorization approval request to the cloud authorization server 5. In step M716, the cloud authorization server 5 transmits authorization code that is based on the OAuth 2.0 method to the mobile 2.

In step M717, the mobile 2 performs, with respect to the device 1, cloud security setting, such as certificate authority (CA) certification, required for encrypted communication between each of the cloud authorization server 5 and the cloud server 6 and the device 1.

In step M718, the mobile 2 transmits a cloud setting parameter information updating request to the device 1 based on the cloud setting parameter information input in step M616 illustrated in FIG. 6 and the authorization code received from the cloud authorization server 5 in step M716.

In step M719, the device 1 updates the cloud setting parameter information 43 included in the provisioning information 41 retained by the device 1 based on the cloud setting parameter information received from the mobile 2. In step M720, the device 1 transmits an updating completion response about the cloud setting parameter information 43 to the mobile 2.

In step M721, the device 1 specifies authorization code included in the cloud setting parameter information 43 and transmits an access token request that is based on the OAuth 2.0 method to the cloud authorization server 5. In step M722, the cloud authorization server 5 transmits an access token that is based on the OAuth 2.0 method to the device 1.

In step M723, the device 1 specifies the access token received from the cloud authorization server 5 in step M722 and transmits a connection request to the cloud server 6. Furthermore, in the present exemplary embodiment, the connection request to the cloud server 6 can be any request message which is able to be processed by the cloud server 6. In step M724, the cloud server 6 transmits a connection completion message (a response message responsive to the connection request message transmitted in step M723) to the device 1.

In step M725, the device 1 updates the provisioning status 411 included in the provisioning information 41 to "cloud setting completed".

Moreover, in the present exemplary embodiment, in step M726, the device 1 updates the cloud setting status 50 to "cloud setting completed". In step M727, the mobile 2 ends the setting application.

Figure 8:
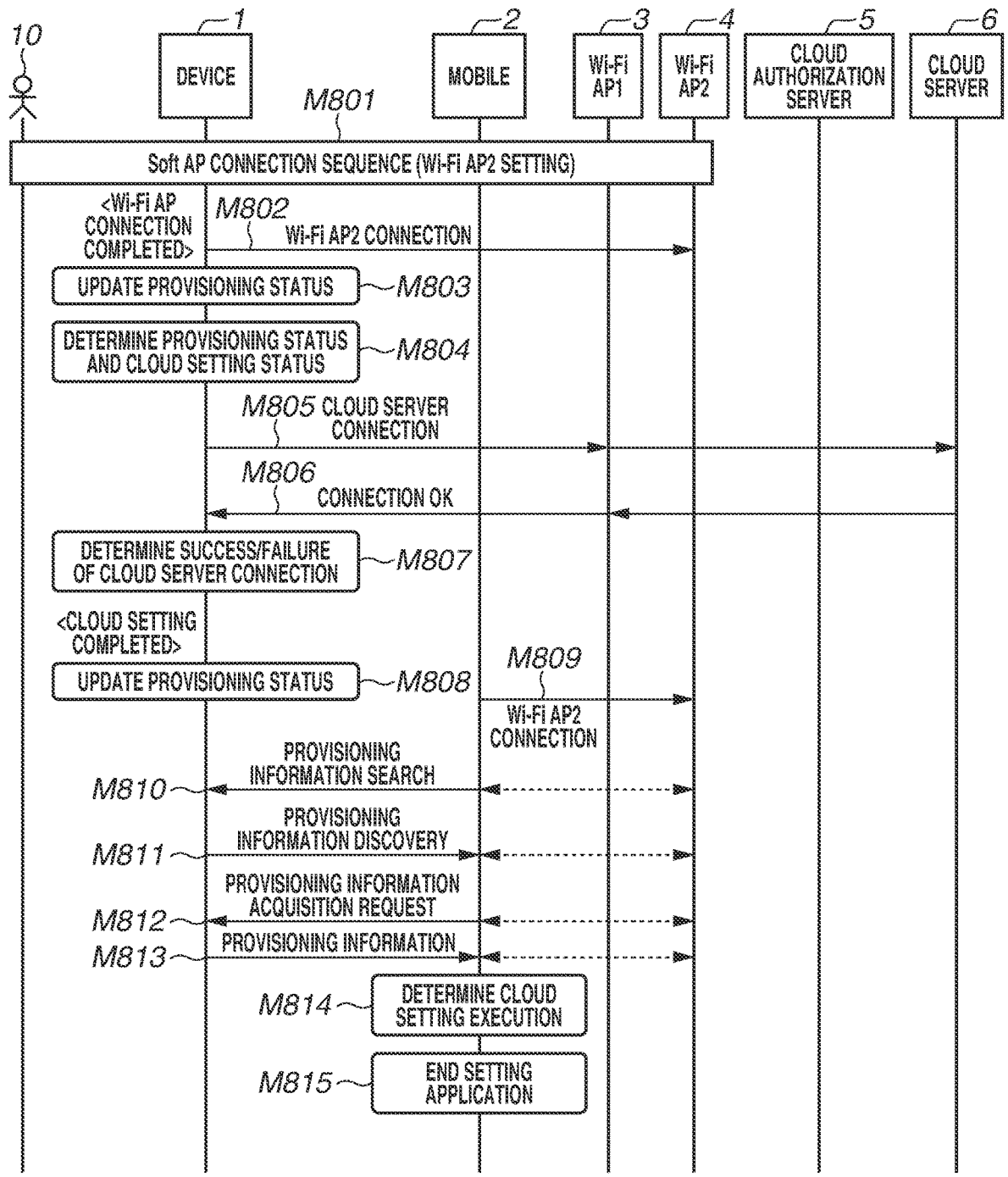
FIG. 8 is a diagram illustrating an example of a processing sequence in which the device connects to a Wi-Fi® AP2 and updates a provisioning status in the exemplary embodiment.

FIG. 8 is a sequence diagram illustrating an example of messages sent when, at the time of Wi-Fi® AP2 connection of the device 1, the device 1 updates the provisioning status 411. Furthermore, during a period from step M805 to step M813, communications between the device 1 and the mobile 2 are performed on the Wi-Fi® AP2 communication network 8b.

In step M801, the device 1 performs Wi-Fi® parameter information setting concerning the Wi-Fi® AP2 4 on the Soft AP communication network 7 in conjunction with the mobile 2. A specific sequence is the same as that in FIG. 6 except that the Wi-Fi® parameter information concerning the Wi-Fi® AP1 3 in FIG. 6 is replaced with the Wi-Fi® parameter information concerning the Wi-Fi® AP2 4.

In step M802, the device 1 connects to the Wi-Fi® AP2 4 using the Wi-Fi® parameter information set in step M801. Here, connection to the Wi-Fi® AP2 4 is assumed to be successful.

In step M803, the device 1 updates the provisioning status 411 included in the provisioning information 41 to "Wi-Fi® AP connection completed".

In step M804, the device 1 compares the provisioning status 411 included in the provisioning information 41 and the cloud setting status 50 with each other and determines whether both statuses are matched each other. Here, since the provisioning status 411 is "Wi-Fi® AP connection completed" updated in step M803 and the cloud setting status 50 is "cloud setting completed" updated in step M726 in FIG. 7, the device 1 determines that both statuses are unmatched.

In step M805, the device 1 performs a trial of connection to the cloud server 6 using the cloud setting parameter information 43 included in the current provisioning information 41. More specifically, the device 1 performs a trial similar to that in step M723 illustrated in FIG. 7. In step M806, the cloud server 6 transmits a connection completion message (a response message responsive to the connection request message transmitted in step M805) to the device 1.

In step M807, the device 1 analyzes a connection request result received from the cloud server 6 in step M806 and determines whether connection to the cloud server 6 is successful. Here, the connection to the cloud server 6 is assumed to be successful.

In step M808, the device 1 updates the provisioning status 411 included in the provisioning information 41 to "cloud setting completed".

In step M809, the mobile 2 connects to the Wi-Fi® AP2 4. Furthermore, steps M810 to M813 are similar in processing to steps M704 to M707 illustrated in FIG. 7 and are, therefore, omitted from description. At the stage of step M813, the provisioning information 41 including the provisioning status 411 indicating "cloud setting completed" is transmitted from the device 1 to the mobile 2. On the other hand, since the cloud setting status 50 is not transmitted from the device 1 to the mobile 2, the mobile 2 is able to constantly refer to the provisioning status 411 to accurately determine necessity or unnecessity of cloud setting to the device 1.

In step M814, the mobile 2 refers to the provisioning status 411 included in the current provisioning information 41 received from the device 1 in step M813 and determines whether the provisioning status 411 is "cloud setting completed". At this point, the provisioning status 411 is previously updated from "Wi-Fi® AP connection completed" to "cloud setting completed" in step M808. Therefore, the mobile 2 determines not to perform updating of the cloud setting parameter information, in other words, not to re-perform cloud setting.

In step M815, the mobile 2 ends the setting application.

Figure 9:
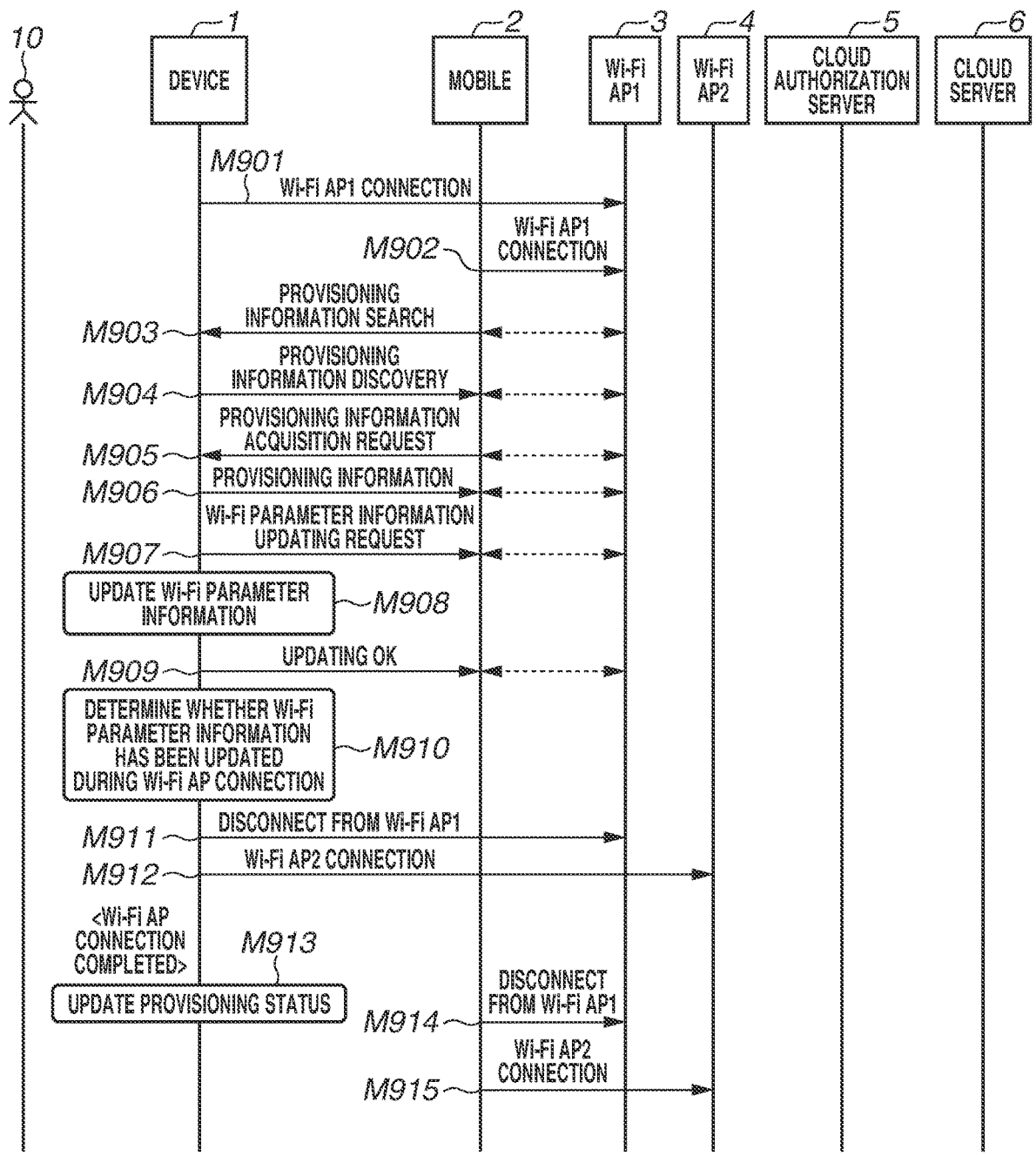
FIG. 9 is a diagram illustrating an example of a processing sequence in which the device connects to the Wi-Fi® AP1 and sets Wi-Fi® parameter information in the exemplary embodiment.

FIG. 9 is a sequence diagram illustrating an example of messages sent when, at the time of Wi-Fi® AP1 connection of the device 1, the device 1 sets the Wi-Fi® parameter information acquired from the mobile 2 to the device 1. Furthermore, during a period from step M903 to step M909, communications between the device 1 and the mobile 2 are performed on the Wi-Fi® AP1 communication network 8a.

In step M901, the device 1 connects to the Wi-Fi® AP1 3. Here, connection to the Wi-Fi® AP1 3 is assumed to be successful. Similarly, in step M902, the mobile 2 connects to the Wi-Fi® AP1 3.

Furthermore, steps M903 to M906, which are similar in processing to steps M704 to M707 illustrated in FIG. 7, and steps M907 to M909, which are similar in processing to steps M617 to M619 illustrated in FIG. 6, are, therefore, omitted from description.

In step M910, the device 1 determines whether the Wi-Fi® parameter information 42 has been updated not during Soft AP connection of the device 1 but during connection to the Wi-Fi® AP1 3 or the Wi-Fi® AP2 4. Here, it is assumed to have been updated, so that the device 1 determines to reconnect to a Wi-Fi® AP. In step M911, the device 1 disconnects from the Wi-Fi® AP1 3.

Furthermore, steps M912 to M913 are similar to steps M802 to M803 illustrated in FIG. 8. In other words, in step M913, the device 1 updates the provisioning status 411 included in the provisioning information 41 to "Wi-Fi® AP connection completed".

In step M914, the mobile 2 disconnects from the Wi-Fi® AP1 3. In step M915, as in step M809 in FIG. 8, the mobile 2 connects to the Wi-Fi® AP2 4.

<Processing Flow of Parameter Information Setting and Provisioning Status Updating>

Figure 10:
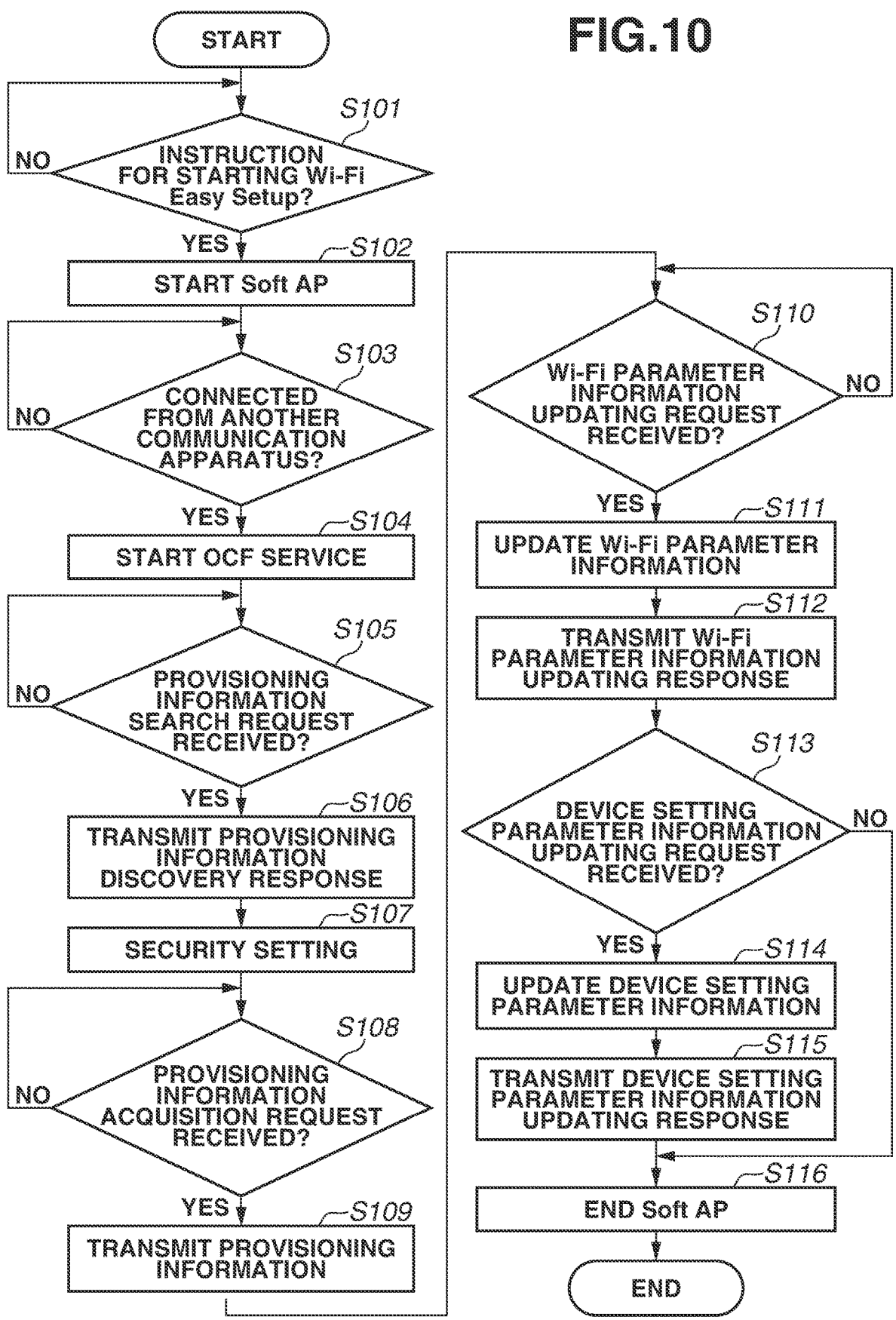
FIG. 10 is a flowchart illustrating a processing procedure in which the device connects to the Soft AP and sets Wi-Fi® parameter information in the exemplary embodiment.

FIG. 10 is a flowchart illustrating an operation procedure in which, at the time of Soft AP connection of the device 1 according to the present exemplary embodiment, the device 1 sets Wi-Fi® parameter information acquired from the mobile 2.

In step S101, the operation control unit 34 of the device 1 determines whether the device 1 has received an OCF Wi-Fi® Easy Setup start instruction from the user 10. If the device 1 has received the start instruction (YES in step S101), the processing proceeds to step S102, and, on the other hand, if the device 1 has not received the start instruction (NO in step S101), the processing returns to step S101, thus waiting for the start instruction.

In step S102, the wireless LAN communication control unit 35 of the device 1 starts wireless LAN communication (Soft AP) in an access point mode in which the device 1 serves as an access point.

In step S103, the wireless LAN communication control unit 35 of the device 1 determines whether the device 1 has been subjected to Soft AP connection from another communication apparatus. In the present exemplary embodiment, another communication apparatus is the mobile 2. If the device 1 has been subjected to Soft AP connection (YES in step S103), the processing proceeds to step S104, and, on the other hand, if the device 1 has not been subjected to Soft AP connection (NO in step S103), the processing returns to step S103. In step S104, the OCF communication control unit 36 of the device 1 starts an OCF service.

In step S105, the OCF communication control unit 36, which has started the OCF service, determines whether the device 1 has received a provisioning information search request from another communication apparatus (the mobile 2). If the device 1 has received the provisioning information search request (YES in step S105), the processing proceeds to step S106, and, on the other hand, if the device 1 has not received the provisioning information search request (NO in step S105), the processing returns to step S105.

In step S106, the OCF communication control unit of the device 1 transmits, to another communication apparatus (the mobile 2), a provisioning information discovery response, which includes a device ID able to be used to uniquely identify the device 1, in response to the provisioning information search request received in step S105.

In step S107, the OCF communication control unit 36 of the device 1 performs security setting, which is used to perform, for example, encrypted communication or access control, in conjunction with another communication apparatus connected thereto.

In step S108, the OCF communication control unit 36 of the device 1 determines whether the device 1 has received a provisioning information acquisition request from another communication apparatus. If the device 1 has received the provisioning information acquisition request (YES in step S108), the processing proceeds to step S109, and, on the other hand, if the device 1 has not received the provisioning information acquisition request (NO in step S108), the processing returns to step S108.

In step S109, the OCF communication control unit of the device 1 transmits the current provisioning information 41 to another communication apparatus which has transmitted the provisioning information search request in step S105.

In step S110, the Wi-Fi® parameter information acquisition unit 38 of the device 1 determines whether the device 1 has received a Wi-Fi® parameter information updating request from another communication apparatus. If the device 1 has received the Wi-Fi® parameter information updating request (YES in step S110), the processing proceeds to step S111, and, on the other hand, if the device 1 has not received the Wi-Fi® parameter information updating request (NO in step S110), the processing returns to step S110.

In step S111, the parameter information setting unit 311 of the device 1 sets Wi-Fi® parameter information to be updated, received from another communication apparatus in step S110, to the Wi-Fi® parameter information 42 included in the provisioning information 41. In step S112, the OCF communication control unit 36 of the device 1 transmits a Wi-Fi® parameter information updating response to another communication apparatus.

In step S113, the device setting parameter information acquisition unit 314 of the device 1 determines whether the device 1 has received a device setting parameter information updating request from another communication apparatus. If the device 1 has received the device setting parameter information updating request (YES in step S113), the processing proceeds to step S114, and, on the other hand, if the device 1 has not received the device setting parameter information updating request (NO in step S113), the processing proceeds to step S116.

In step S114, the parameter information setting unit 311 of the device 1 sets device setting parameter information received from another communication apparatus in step S113 to the device setting parameter information 44 included in the provisioning information 41. In step S115, the OCF communication control unit 36 of the device 1 transmits a device setting parameter information updating response to another communication apparatus which has transmitted the device setting parameter information updating request in step S113. In step S116, the wireless LAN communication control unit 35 of the device 1 ends Soft AP communication, thus ending the processing.

Figure 11:
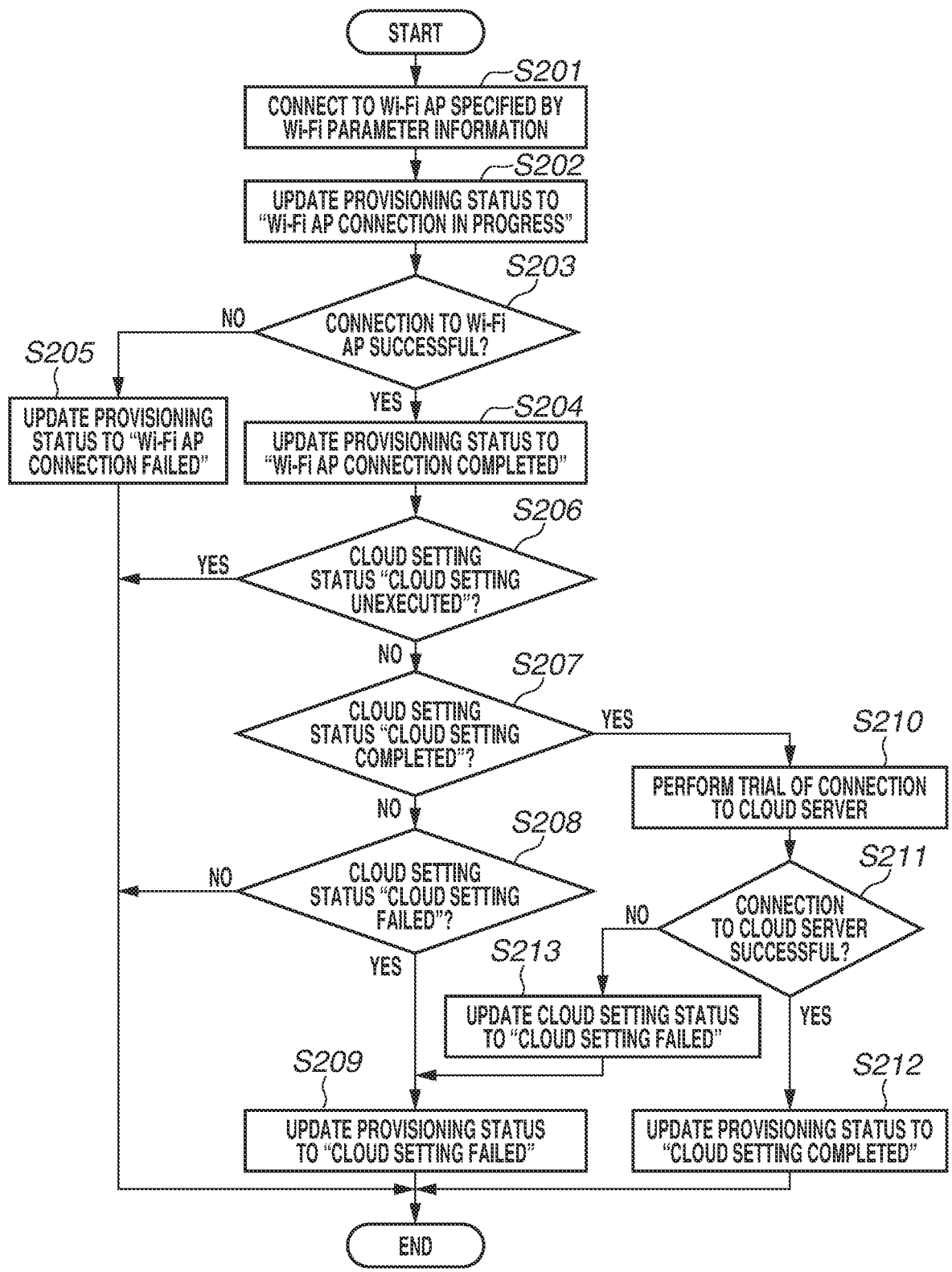
FIG. 11 is a flowchart illustrating a processing procedure in which the device connects to a Wi-Fi® AP and updates the provisioning status in the exemplary embodiment.

FIG. 11 is a flowchart illustrating an operation procedure in which, at the time of Wi-Fi® AP connection of the device 1 according to the present exemplary embodiment, the device 1 updates the provisioning status 411 based on parameter information acquired from the mobile 2.

In step S201, the wireless LAN communication control unit 35 of the device 1 starts connection to a Wi-Fi® AP using the parameter specified in the Wi-Fi® parameter information 42 included in the provisioning information 41.

In step S202, the provisioning status management unit 312 of the device 1 updates the provisioning status 411 included in the provisioning information 41 to "Wi-Fi® AP connection in progress".

In step S203, the wireless LAN communication control unit 35 of the device 1 determines whether connection to a Wi-Fi® AP in step S201 is successful. If the connection is successful (YES in step S203), the processing proceeds to step S204, and, on the other hand, if the connection is failed (NO in step S203), the processing proceeds to step S205.

If the connection is successful, then in step S204, the provisioning status management unit 312 of the device 1 updates the provisioning status 411 included in the provisioning information 41 to "Wi-Fi® AP connection completed". On the other hand, if the connection is failed, then in step S205, the provisioning status management unit 312 of the device 1 updates the provisioning status 411 included in the provisioning information 41 to "Wi-Fi® AP connection failed", and the processing then ends.

In step S206 after step S204, the cloud setting status management unit 313 of the device 1 determines whether the current cloud setting status 50 is "cloud setting unexecuted". If the cloud setting status 50 does not correspond to "cloud setting unexecuted" (NO in step S206), the processing proceeds to step S207, and, on the other hand, if the cloud setting status 50 corresponds to "cloud setting unexecuted" (YES in step S206), the processing ends.

In step S207, the cloud setting status management unit 313 of the device 1 determines whether the current cloud setting status 50 is "cloud setting completed". If the cloud setting status 50 does not correspond to "cloud setting completed" (NO in step S207), the processing proceeds to step S208, and, on the other hand, if the cloud setting status 50 corresponds to "cloud setting completed" (YES in step S207), the processing proceeds to step S210.

If the cloud setting status 50 does not correspond to "cloud setting completed", then in step S208, the cloud setting status management unit 313 of the device 1 determines whether the current cloud setting status 50 is "cloud setting failed". If the cloud setting status 50 corresponds to "cloud setting failed" (YES in step S208), the processing proceeds to step S209, and, on the other hand, if the cloud setting status 50 does not correspond to "cloud setting failed" (NO in step S208), the processing ends.

If the cloud setting status 50 corresponds to "cloud setting failed", then in step S209, the provisioning status management unit 312 of the device 1 updates the provisioning status 411 included in the provisioning information 41 to "cloud setting failed", and the processing then ends.

On the other hand, if, in step S207, the cloud setting status 50 corresponds to "cloud setting completed", then in step S210, the cloud communication control unit 37 of the device 1 performs a trial of connection to the cloud server 6 using the cloud setting parameter information 43 included in the current provisioning information 41. At this time, the cloud communication control unit 37 specifies an access token acquired from the cloud authorization server 5 at the time of the previous cloud setting to perform the trial of connection. Furthermore, in the present exemplary embodiment, the trial of connection to the cloud server 6 can be performed by transmitting any request message that is able to be processed by the cloud server 6.

In step S211, the cloud communication control unit 37 of the device 1 determines whether the connection to the cloud server 6 is successful. If the connection is successful (YES in step S211), the processing proceeds to step S212, and, on the other hand, if the connection is failed (NO in step S211), the processing proceeds to step S213. Furthermore, in the present exemplary embodiment, the connection to the cloud server 6 being successful can be sufficiently confirmed by receiving a response message indicating the success of processing from the cloud server 6 in response to any request message transmitted from the cloud communication control unit 37 of the device 1 in step S210. Alternatively, it can be confirmed by receiving at least a response message other than response messages indicating the failure of authentication or authorization. Here, specifically, the response messages indicating the failure of authentication or authorization can be HTTP response messages indicating, for example, HTTP status code "401 Unauthorized" or "403 Forbidden".

In step S212 after step S211, the provisioning status management unit 312 of the device 1 updates the provisioning status 411 included in the provisioning information 41 to "cloud setting completed", and the processing then ends.

If, in step S211, the connection to the cloud server 6 is failed, then in step S213, the cloud setting status management unit 313 of the device 1 updates the cloud setting status 50 to "cloud setting failed", and the processing then proceeds to step S209.

Figure 12:
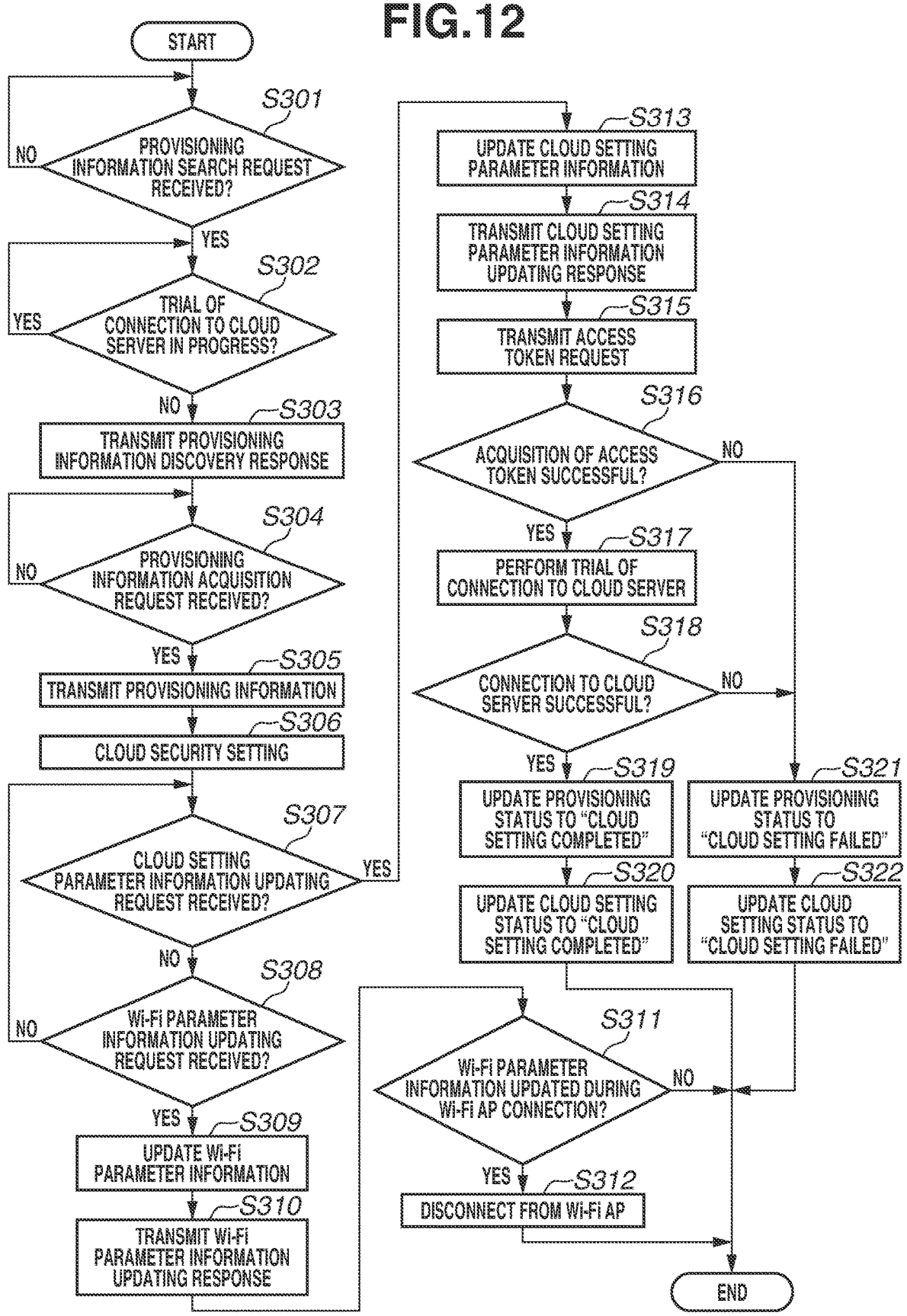
FIG. 12 is a flowchart illustrating a processing procedure in which the device connects to the Wi-Fi® AP and sets the cloud setting parameter information in the exemplary embodiment.

FIG. 12 is a flowchart illustrating an operation procedure in which, at the time of Wi-Fi® AP connection of the device 1 according to the present exemplary embodiment, the device 1 sets cloud setting parameter information based on the parameter information acquired from the mobile 2.

In step S301, the OCF communication control unit of the device 1 determines whether the device 1 has received a provisioning information search request from another communication apparatus. If the device 1 has received the provisioning information search request (YES in step S301), the processing proceeds to step S302, and, on the other hand, if the device 1 has not received the provisioning information search request (NO in step S301), the processing returns to step S301.

In step S302, the cloud communication control unit 37 of the device 1 determines whether a trial of connection to the cloud server 6 is in progress. If the trial of connection is not in progress (NO in step S302), the process proceeds to step S303, and, on the other hand, if the trial of connection is in progress (YES in step S302), the process returns to step S302. Here, in the present exemplary embodiment, the trial of connection to the cloud server 6 being in progress is assumed to be a state in which, while, in step S210 illustrated in FIG. 11, the cloud communication control unit 37 starts the trial of connection, the device 1 has not yet received a response from the cloud server 6, so that step S211 illustrated in FIG. 11 is not yet reached.

If, in step S302, the trial of connection to the cloud server 6 is not in progress, then in step S303, the OCF communication control unit 36 of the device 1 transmits a provisioning information discovery response, which includes a device ID able to be used to uniquely identify the device 1, to the mobile 2.

In step S304, the OCF communication control unit 36 of the device 1 determines whether the device 1 has received a provisioning information acquisition request from another communication apparatus. If the device 1 has received the provisioning information acquisition request (YES in step S304), the processing proceeds to step S305, and, on the other hand, if the device 1 has not received the provisioning information acquisition request (NO in step S304), the processing repeats step S304.

In step S305, the OCF communication control unit 36 of the device 1 transmits the current provisioning information 41 to another communication apparatus which has transmitted the provisioning information acquisition request in step S304.

In step S306, the OCF communication control unit 36 and the cloud communication control unit 37 of the device 1 perform cloud security setting, such as CA certification, required for encrypted communication between each of the cloud authorization server 5 and the cloud server 6 and another communication apparatus connected thereto.

In step S307, the cloud setting parameter information acquisition unit 39 of the device 1 determines whether the device 1 has received a cloud setting parameter information updating request from another communication apparatus. If the device 1 has received the cloud setting parameter information updating request (YES in step S307), the processing proceeds to step S313, and, on the other hand, if the device 1 has not received the cloud setting parameter information updating request (NO in step S307), the processing proceeds to step S308.

In step S308, the Wi-Fi® parameter information acquisition unit 38 of the device 1 determines whether the device 1 has received a Wi-Fi® parameter information updating request from another communication apparatus. If the device 1 has received the Wi-Fi® parameter information updating request (YES in step S308), the processing proceeds to step S309, and, on the other hand, if the device 1 has not received the Wi-Fi® parameter information updating request (NO in step S308), the processing returns to step S307.

If, in step S308, the device 1 has received the Wi-Fi® parameter information updating request, then in step S309, the parameter information setting unit 311 of the device 1 sets the Wi-Fi® parameter information received from another communication apparatus to the Wi-Fi® parameter information 42 included in the provisioning information 41. In step S310, the OCF communication control unit 36 of the device 1 transmits a Wi-Fi® parameter information updating response to another communication apparatus which has transmitted the Wi-Fi® parameter information updating request.

In step S311, the Wi-Fi® parameter information acquisition unit 38 of the device 1 determines whether the device 1 has updated the Wi-Fi® parameter information during the progress of Wi-Fi® AP connection. If the device 1 has updated the Wi-Fi® parameter information (YES in step S311), the processing proceeds to step S312, and, on the other hand, if the device 1 has not updated the Wi-Fi® parameter information (NO in step S311), the processing ends.

In step S312, the wireless LAN communication control unit 35 of the device 1 disconnects from a Wi-Fi® AP that is in the process of being connected, and the processing then ends.

If, in step S307, the device 1 has received the cloud setting parameter information updating request, then in step S313, the cloud setting parameter information acquisition unit 39 of the device 1 sets the received cloud setting parameter information to the cloud setting parameter information 43 included in the provisioning information 41.

In step S314, the OCF communication control unit 36 of the device 1 transmits a cloud setting parameter information updating response to another communication apparatus which has transmitted the cloud setting parameter information updating request.

In step S315, the cloud communication control unit 37 of the device 1 transmits an access token request that is based on the OAuth 2.0 method to the cloud authorization server 5 using the address of the cloud authorization server and authorization code included in the cloud setting parameter information 43.

In step S316, the cloud communication control unit 37 of the device 1 determines whether the device 1 has succeeded in receiving an access token that is based on the OAuth 2.0 method from the cloud authorization server 5. If the device 1 has succeeded in receiving the access token (YES in step S316), the processing proceeds to step S317, and, on the other hand, if the device 1 has not received the access token (NO in step S316), the processing proceeds to step S321.

In step S317, as in step S210 illustrated in FIG. 11, the cloud communication control unit 37 of the device 1 performs a trial of connection to the cloud server 6 using the cloud setting parameter information 43 included in the current provisioning information 41.

In step S318, the cloud communication control unit 37 of the device 1 determines whether the connection to the cloud server 6 is successful. If the connection is successful (YES in step S318), the processing proceeds to step S319, and, on the other hand, if the connection is failed (NO in step S318), the processing proceeds to step S321.

If the connection to the cloud server 6 is successful, then in step S319, as in step S212 illustrated in FIG. 11, the provisioning status management unit 312 of the device 1 updates the provisioning status 411 included in the provisioning information 41 to "cloud setting completed".

In step S320, the cloud setting status management unit 313 updates the cloud setting status 50 to "cloud setting completed", and the processing then ends.

Referring back to step S318, if the connection to the cloud server 6 is failed, then in step S321, as in step S209 illustrated in FIG. 11, the provisioning status management unit 312 of the device 1 updates the provisioning status 411 included in the provisioning information 41 to "cloud setting failed". In step S322, as in step S213 illustrated in FIG. 11, the cloud setting status management unit 313 of the device 1 updates the cloud setting status 50 to "cloud setting failed", and the processing then ends.

As described above, according to the present exemplary embodiment, the provisioning status management unit 312 and the cloud setting status management unit 313 respectively and individually manage the provisioning status 411 and the cloud setting status 50. Then, in the device 1, the control unit 31 compares the state indicated by the provisioning status 411 and the state indicated by the cloud setting status 50 with each other and determines matching or unmatching of both states. In a case where the provisioning status 411 is "Wi-Fi® AP connection completed" and the cloud setting status 50 is "cloud setting completed", the provisioning status management unit 312 updates the provisioning status 411 to "cloud setting completed". With the above-mentioned operation performed, according to the present exemplary embodiment, re-execution of cloud setting to the device 1, which is intrinsically unnecessary, can be effectively prevented.

For example, suppose that the device 1 has previously completed Wi-Fi® AP setting and cloud setting and the provisioning status 411 is in a state of being "cloud setting completed". At this time, when receiving the Wi-Fi® parameter information updating request from the mobile 2, the device 1 re-updates the Wi-Fi® parameter information 42. Here, in the related art, after Wi-Fi® AP connection, the provisioning status 411 would be overwritten with "Wi-Fi® AP connection completed". In other words, the state of the actual cloud setting in the device 1 and the state indicated by the provisioning status 411 would become unmatched. At this time, the mobile 2, when referring to the provisioning status 411 of the device 1, may determine that cloud setting is not yet completed. As a result, the mobile 2 may transmit the cloud setting parameter information updating request to the device 1, thus re-executing cloud setting to the device 1.

On the other hand, in the present exemplary embodiment, as mentioned above, the provisioning status management unit 312 refers to the cloud setting status 50 and updates the provisioning status 411 to "cloud setting completed". Therefore, the state of the actual cloud setting and the provisioning status 411 become matched. As a result, the mobile 2, when referring to the provisioning status 411 of the device 1, can correctly determine that cloud setting is previously completed. Accordingly, re-execution of cloud setting from the mobile 2 to the device 1 can be prevented, so that processing can be simplified.

Furthermore, according to the present exemplary embodiment, before updating the provisioning status 411 to "cloud setting completed", the provisioning status management unit 312 performs a trial to determine whether the device 1 is able to connect to the cloud server 6 via the cloud communication control unit 37.

For example, suppose that, even when the cloud setting status 50 is in a state of being "cloud setting completed", account information, particularly, an ID, registered with the cloud authorization server 5 has been inadvertently changed. In this case, an access token which is currently retained by the device 1 becomes invalid. Therefore, the device 1 may fail in connecting to the cloud server 6, so that this state does not match "cloud setting completed", which is the updated provisioning status 411.

On the other hand, in the present exemplary embodiment, as mentioned above, before updating the provisioning status 411, the provisioning status management unit 312 performs a trial of connection from the device 1 to the cloud server 6. If connection to the cloud server 6 is unsuccessful, the provisioning status management unit 312 updates the provisioning status 411 to "cloud setting failed". Therefore, even in a case where connection to the cloud server 6 is unsuccessful, the state indicated by the provisioning status 411 can be made to match the state of the actual cloud setting. Accordingly, while unnecessary cloud setting is avoided, cloud setting can be executed on an as-needed basis, so that user convenience can be improved.

Furthermore, according to the present exemplary embodiment, when having updated the Wi-Fi® parameter information 42 included in the provisioning information 41 during the progress of Wi-Fi® AP connection, the device 1 immediately connects to a Wi-Fi® AP specified by the Wi-Fi® parameter information 42.

Suppose that, after updating the Wi-Fi® parameter information 42, the device 1 has not connected to the specified Wi-Fi® AP. In this case, even if the specified Wi-Fi® parameter information 42 is wrong, the user 10 cannot immediately understand whether Wi-Fi® AP setting to the device 1 is successful.

On the other hand, in the present exemplary embodiment, as mentioned above, since, when having updated the Wi-Fi® parameter information 42, the device 1 immediately connects to the specified Wi-Fi® AP, the user 10 can understand whether Wi-Fi® AP setting to the device 1 is successful. Accordingly, user convenience can be improved.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-043336, filed Mar. 7, 2017, which is hereby incorporated by reference herein in its entirety.

What is claimed is:

1. A communication apparatus capable of connecting to a server via an access point, the communication apparatus comprising:
at least one memory; and
at least one processor that, when executing a program stored in the at least one memory, causes the communication apparatus to function as:
a first acquisition unit configured to acquire first setting information for connecting to the access point;
a second acquisition unit configured to acquire second setting information for connecting to the server;
a setting unit configured to set the acquired first setting information and the acquired second setting information to the communication apparatus;
a connection unit configured to cause the communication apparatus to connect to the access point using the set first setting information and to cause the communication apparatus to connect to the server using the set second setting information;
a first retention unit configured to retain first state information that is state information indicating a state of setting of the first setting information and the second setting information to the communication apparatus and which, in a case where the first setting information has been set after the second setting information is set, indicates that the first setting information is in a state of being set;
a second retention unit configured to retain second state information that is state information indicating a state of setting of the second setting information to the communication apparatus and which, even in a case where the first setting information has been set after the second setting information is set, indicates that the second setting information is in a state of being set; and
an updating unit configured to update, in a case where the connection unit causes the communication apparatus to connect to the access point, the first state information indicates that the first setting information is in a state of being set, and the second state information indicates that the second setting information is in a state of being set, the first state information to indicate that the second setting information is in a state of being set.

2. The communication apparatus according to claim 1, wherein, in a case where the first state information indicates that the first setting information is in a state of being set and the second state information indicates that the second setting information is in a state of being set, the updating unit determines whether connection to the server is successful, and, in a case where the connection to the server is successful, updates the first state information to indicate that the second setting information is in a state of being set.

3. The communication apparatus according to claim 1, wherein, when the first setting information has been updated during progress of connecting to the access point, the connection unit causes the communication apparatus to connect to an access point specified by the updated first setting information.

4. The communication apparatus according to claim 1, wherein the first acquisition unit and the second acquisition unit respectively acquire the first setting information and the second setting information from another communication apparatus connected to the communication apparatus via peer-to-peer wireless.

5. The communication apparatus according to claim 4, further comprising a transmission unit configured to transmit the first state information retained by the first retention unit to the another communication apparatus.

6. The communication apparatus according to claim 1, wherein the communication apparatus is an Open Connectivity Foundation® (OCF) device compliant with OCF Wi-Fi® Easy Setup.

7. A communication control method for controlling a communication apparatus capable of connecting to a server via an access point, the communication control method comprising:
acquiring first setting information for connecting to the access point;
acquiring second setting information for connecting to the server;
setting the acquired first setting information and the acquired second setting information to the communication apparatus;
causing the communication apparatus to connect to the access point using the set first setting information and causing the communication apparatus to connect to the server using the set second setting information;
retaining first state information that is state information indicating a state of setting of the first setting information and the second setting information to the communication apparatus and which, in a case where the first setting information has been set after the second setting information is set, indicates that the first setting information is in a state of being set;
retaining second state information that is state information indicating a state of setting of the second setting information to the communication apparatus and which, even in a case where the first setting information has been set after the second setting information is set, indicates that the second setting information is in a state of being set; and updating, in a case where the communication apparatus connects to the access point, the first state information indicates that the first setting information is in a state of being set, and the second state information indicates that the second setting information is in a state of being set, the first state information to indicate that the second setting information is in a state of being set.

8. A non-transitory computer-readable storage medium storing computer-executable instructions that, when executed by a computer, cause the computer to perform a method for a communication apparatus capable of connecting to a server via an access point, the method comprising:

acquiring first setting information for connecting to the access point;

acquiring second setting information for connecting to the server;

setting the acquired first setting information and the acquired second setting information to the communication apparatus;

causing the communication apparatus to connect to the access point using the set first setting information and causing the communication apparatus to connect to the server using the set second setting information;

retaining first state information that is state information indicating a state of setting of the first setting information and the second setting information to the communication apparatus and which, in a case where the first setting information has been set after the second setting information is set, indicates that the first setting information is in a state of being set;

retaining second state information that is state information indicating a state of setting of the second setting information to the communication apparatus and which, even in a case where the first setting information has been set after the second setting information is set, indicates that the second setting information is in a state of being set; and updating, in a case where the communication apparatus connects to the access point, the first state information indicates that the first setting information is in a state of being set, and the second state information indicates that the second setting information is in a state of being set, the first state information to indicate that the second setting information is in a state of being set.

* * * * *